United States Patent [19]

Akiyama

[11] Patent Number: 5,105,360

[45] Date of Patent: Apr. 14, 1992

[54] APPARATUS AND METHOD OF CONTROLLING AUTOMOTIVE WHEEL TRACTION AND SLIPPAGE USING AN AUXILIARY THROTTLE VALVE

[75] Inventor: Takeo Akiyama, Tokyo, Japan

[73] Assignee: Nissan Motor Company, Ltd., Japan

[21] Appl. No.: 574,688

[22] Filed: Aug. 30, 1990

[30] Foreign Application Priority Data

Sep. 9, 1989 [JP] Japan .................. 1-230020

[51] Int. Cl.⁵ ............... B60K 31/04; B60K 28/16
[52] U.S. Cl. .................. 364/426.03; 180/197; 123/336
[58] Field of Search .......... 180/197; 364/426.03, 364/426.02, 431.03; 123/336, 352

[56] References Cited

U.S. PATENT DOCUMENTS

| | | | |
|---|---|---|---|
| 4,866,623 | 9/1989 | Ise et al. | 364/426.03 X |
| 4,926,333 | 5/1990 | Hashiguchi et al. | 364/426.02 |
| 4,947,954 | 8/1990 | Fujita et al. | 364/426.03 X |
| 4,955,448 | 9/1990 | Ise et al. | 364/426.03 X |
| 4,971,164 | 11/1990 | Fujita et al. | 364/426.03 X |
| 4,974,694 | 12/1990 | Matsumoto | 364/426.02 X |
| 4,985,837 | 1/1991 | Togai et al. | 364/426.02 |
| 5,022,483 | 6/1991 | Tsuyama et al. | 364/426.02 X |
| 5,033,574 | 7/1991 | Kushi et al. | 180/197 |

Primary Examiner—Parshotam S. Lall
Assistant Examiner—Thomas S. Auchterlonic
Attorney, Agent, or Firm—Lowe, Price, LeBlanc & Becker

[57] ABSTRACT

A system and method for controlling engine output applicable to an automotive vehicle are disclosed in which when engine output control to reduce the engine output through a second throttle valve (additionally installed in an engine intake passage in series with a first throttle valve interlocked with an accelerator element) is ended, a returning speed of the second throttle valve toward its fully open position is made slower than that carried out during the engine output reduction control so as to suppress drive wheel slippage and a target opening angle of the second throttle valve by which the second throttle valve is returned to the open position is set to an opening angle of the first throttle valve to which an offset quantity is added to improve acceleration response immediately after engine output control has been carried out.

10 Claims, 6 Drawing Sheets

APPARATUS AND METHOD OF CONTROLLING AUTOMOTIVE WHEEL TRACTION AND SLIPPAGE USING AN AUXILIARY THROTTLE VALVE

BACKGROUND OF THE INVENTION (1) Field of the invention:

The present invention relates to a system and method for controlling an engine output to suppress wheel slippage in an automotive vehicle.

(2) Background art

Japanese Patent Application First Publication (Unexamined) No. Showa 62-45944 published on Feb. 27, 1987 exemplifies a previously proposed system for controlling engine output to suppress drive wheel slippage.

In the previously proposed system, another (second) throttle valve which is externally controllable is installed within a throttle chamber of an intake air passage of a vehicular engine in series with the usual (first) throttle valve which is linked to the accelerator pedal.

During occurrence of slippage affecting drive wheels, the second throttle valve is controlled in three modes, i.e., fully open, hold, and fully closed, according to situations (e.g., magnitude) in which drive wheel slippage occurs. Then, a control system for the second throttle valve, independent of the acceleration system including the first throttle valve, controls an opening angle of the second throttle valve to reduce engine output (torque) so as to suppress drive wheel slippage.

In such a previously proposed system for controlling the engine output as described above, in a case where after start of the engine output reduction control through the second throttle valve at a time during which the opening angles of both first and second throttle valves coincide with each other has passed a predetermined duration of time, engine output control to reduce the engine output is ended. In addition, when the engine output (reduction) control end condition is satisfied, the second throttle valve returns to the fully open position to be set at a high speed which is the same as that carried out during the engine output reduction control to suppress slips on the drive wheels.

Therefore, in a case where engine output reduction control is resumed a very short time after the end of a previous engine output reduction control, a longer interval of time ($T_L$ in FIG. 6) is required for the second throttle valve to be returned to a predetermined opening angle since the second throttle valve has already returned to the fully open position at the time of the termination of the previous engine output control (as denoted by a dot-dot-and-dash line in FIG. 6), therefore responsiveness in controlling drive wheel slippage is reduced.

It is noted that such a response delay easily occurs under such conditions as, for example, when the vehicle runs with the first throttle valve fully opened or during a vehicle run on a low friction surface.

Furthermore, in a case where, in order to eliminate such a response delay as described above, the return speed of the second throttle valve toward the fully open position is made slower and a target opening angle of the second throttle valve toward which the second throttle valve is returned is set at the opening angle of the first throttle valve, in this case, an abrupt depression of an accelerator pedal by the driver with intention to abruptly accelerate after the end of the engine output control, (as denoted by a dot-and-dash line of FIG. 7) the opening angle of the second throttle valve is made smaller than that of the first throttle valve. Therefore, engine output is dependent on the opening angle of the second throttle valve and no rise in the engine output characteristic corresponding to the operation of accelerator pedal can be achieved and acceleration performance is degraded.

SUMMARY OF THE INVENTION

It is, therefore, an object of the present invention to provide a system and method for controlling engine output to suppress drive wheel slippage utilizing a second throttle valve, in addition to a first throttle valve associated with an accelerator, in which improvements in the responsive characteristics controlling drive wheel slippage under conditions generating such slippage can continually be achieved and in an acceleration upon completion of the engine output control can simultaneously be achieved.

The above-described object can be achieved by providing a system for controlling engine output to suppress drive wheel slippage applicable to an automotive vehicle, comprising: a) a first engine driving force adjusting mechanism installed within an engine intake passage and interlocked with an accelerator element of the vehicle; b) a second engine driving force adjusting mechanism installed in series with the first engine driving force adjusting mechanism; c) an actuator for actuating the second engine driving force adjusting mechanism; d) first means for detecting slip conditions of wheels to which the engine output driving force is transmitted; e) second means for determining whether a predetermined control start condition including wheel slip information is satisfied; f) third means for determining whether a predetermined control end condition including wheel slip information is satisfied; g) fourth means for outputting a control command to the actuator, the control command being output to the actuator so that the actuation of the second engine driving force adjusting mechanism causes the engine output to be reduced for a duration of time in which the predetermined control start condition is satisfied and thereafter the predetermined control end condition is satisfied; h) fifth means for setting an offset quantity of the second engine driving force adjusting mechanism with respect to an opening angle of the first engine driving force adjusting mechanism; i) sixth means for outputting another control command to the valve actuator so that a return speed of the second engine driving force adjusting mechanism is slower than that carried out during the slip suppression control through the second engine driving force adjusting mechanism and that a target opening angle of the second engine driving force adjusting mechanism is set when the second driving force adjusting mechanism returns toward its original position at the return speed to an opening angle of the first engine driving force adjusting mechanism to which the offset quantity is added.

The above-described object can also be achieved by providing a system applicable to an automotive vehicle, comprising: a) a first throttle valve installed within an engine intake passage and interlocked with an accelerator element of the vehicle; b) a second throttle valve additionally installed in series with the first throttle valve which is normally open but which is controlled independently of the first throttle valve when a slip suppression control is carried out; c) an actuator for actuating the second throttle valve; d) first means for detecting slip conditions of a wheel to which the engine output is transmitted; e) second means for establishing a predetermined control start condition of the slip suppression control according to the slip conditions and determining whether the predetermined control start condition is satisfied; f) third means for establishing a predetermined control end condition of the slip suppression control according to the slip conditions and determining whether the predetermined control end condition is satisfied; g) fourth means for outputting a control command to the actuator to actuate the second throttle valve to suppress slip of the wheel, the control command being output to the actuator so that the actuation of the second throttle valve causes the engine output to be reduced for a duration of time in which the predetermined control start condition is satisfied and thereafter the predetermined control end condition is satisfied; h) fifth means for setting an offset quantity of the second throttle valve with respect to an opening angle of the first throttle valve; and i) sixth means for outputting another control command to the actuator after the predetermined control end condition is satisfied so that a return speed of the second throttle valve to the normally open position is slower than that during the slip suppression control and that a target opening angle of the second throttle valve to return to its normally open position is set to an opening angle of the first throttle valve to which the offset quantity is added.

The above described object can also be achieved by providing a method for controlling an engine output applicable to an automotive vehicle, comprising the steps of: a) providing a first throttle valve installed within an engine intake passage and interlocked with an accelerator element of the vehicle; b) providing a second throttle valve additionally installed in series with the first throttle valve which is normally open but which is controlled independently of the first throttle valve when a slip suppression control is carried out; c) providing an actuator for actuating the second throttle valve; d) detecting slip conditions of drive wheels to which the engine output is transmitted; e) establishing a predetermined control start condition of a slip suppression control according to the slip conditions and determining whether the predetermined control start condition is satisfied; f) establishing a predetermined control end condition of slip suppression control according to the slip conditions and determining whether the predetermined control end condition is satisfied; g) outputting a control command to the actuator to actuate the second throttle valve to suppress slip of a vehicle wheel, the control command being output to the actuator so that the actuation of the second throttle valve causes the engine output to be reduced for a duration of time for which the predetermined control start condition is satisfied and thereafter the predetermined control end condition is satisfied; h) setting an offset quantity of the second throttle valve with respect to an opening angle of the first throttle valve; and i) outputting another control command to the valve actuator after the predetermined control end condition is satisfied so that a return speed of the second throttle valve to the normally open position is slower than that carried out during the slip suppression control and that a target opening angle of the second throttle valve is set to an opening angle of the first throttle valve to which the offset quantity is added.

DETAILED DESCRIPTION OF THE PREFERRED EMBODIMENTS

Reference will hereinafter be made to the drawings in order to facilitate a better understanding of the present invention.

Figure 1:
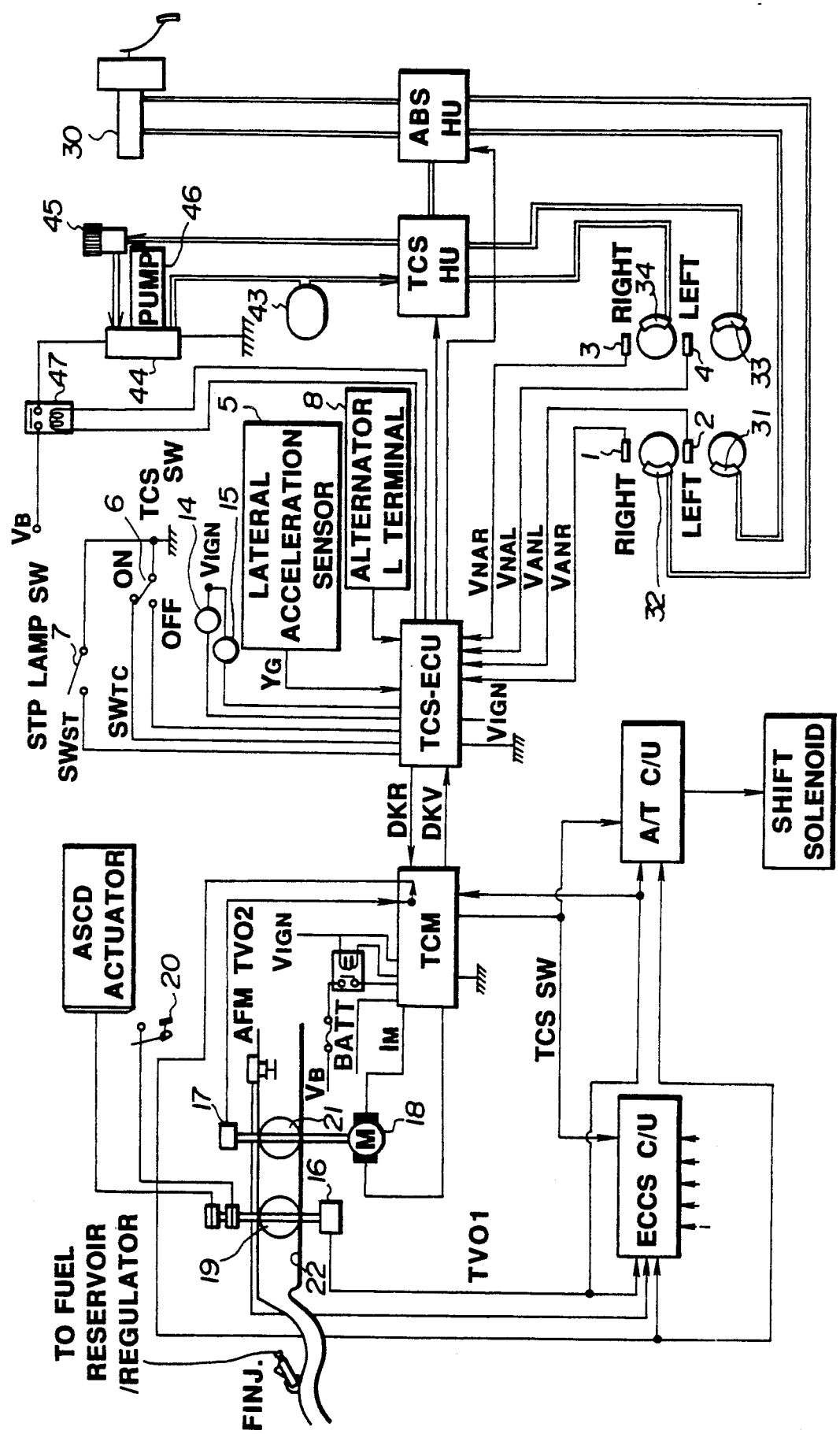
FIG. 1 is a schematic block diagram of a system for controlling engine output for an automotive vehicle applicable to a rear wheel drive vehicle in a preferred embodiment according to the present invention.

FIG. 1 shows a preferred embodiment of a vehicular system for controlling engine output according to the present invention applicable to a control system for a controlled drive system in a rear wheel drive vehicle (FR).

In FIG. 1, a throttle control system (corresponding to a vehicle engine output control system) is shown which controls an opening angle of an engine throttle valve so that a slip rate of rear drive wheels falls in an optimum allowable range, also shown is a brake control system which automatically provides a braking force for one of the left and/or right drive wheels, whichever is about to slip, and an anti-skid brake system (ABS) which carries out the front and rear wheel brake liquid pressure controls in a way so as to prevent wheel locks during abrupt braking. These elements are installed as a traction concentrated control system.

Peripheral systems of the traction concentrated control system include an airflow meter AFM, an engine concentrated electronic control unit (ECCS C/S), and fuel injector F INJ. In addition, the ECCS C/U executes control of fuel injection quantity and injection timing, ignition timing, engine revolution speed during idling. Further included are an automatic transmission control unit A/T C/U and shift solenoid, which carry out gear shift range change control and a lock-up control of an automatic transmission, a shift solenoid and an automatic cruise speed controlling system (ASCD) which control vehicle speed at a desired cruise speed.

Controls related to the traction control carried out using tandem throttle valves which include a select low control such that when a traction switch signal TCS SW is output, indicating that traction control is being carried out, a first throttle signal TV01, and second throttle signal TV02 are received in the ECCS C/U, the signal indicating an opening angle which is narrower than that of the first and second throttle valves is selected in the ECCS C/U and automatic transmission control system (A/T C/U). In addition, in the automatic cruise speed controlling system (ASCD), the automatic speed control is inhibited by the ASCD when the traction control switch signal TCS SW is received.

A structure of the automatic cruise controlling system is exemplified by U.S. Pat. No. 4,845,622 issued on July 4, 1989, the disclosure of which is hereby incorporated by reference.

The structure of the traction concentrated control system will be described below.

In traction control such that the engine driving force is reduced, in order to achieve the most stable vehicle run with high traction under various driving conditions, throttle control by means of the engine throttle valve opening angle controlling system, independent right-and-left rear wheel controls by means of the brake control system, and electronic control of both the opening angle, brake, and anti-skid brake control are executed by a traction control system electronic control unit TCS-ECU (hereinafter abbreviated as TCS-ECU).

The TCU-ECU receives: a right front wheel speed $V_{ANR}$ derived from a right front wheel speed sensor 1; a left front wheel speed $V_{ANL}$ derived from a left front wheel speed sensor 2; a right rear wheel speed $V_{NAR}$ derived from a right rear wheel speed sensor 3; a left rear wheel speed $V_{NAL}$ derived from a left rear wheel speed sensor 4; a lateral acceleration $Y_G$ derived from a lateral acceleration sensor 5; a switch signal $SW_{TC}$ derived from a TCS switch 6; a switch signal $SW_{ST}$ derived from a brake lamp switch 7; an actual opening angle DKV of the first throttle valve derived from a throttle control module TCM; and an output (engine revolution speed monitor) derived from an alternator (L) terminal 8.

A target opening angle DKR of the second throttle valve 21 is derived from a Throttle Control Module (hereinafter, referred to as a TCM) in order to carry out engine throttle valve opening angle control during occurrence of slips on one or both of the drive wheels.

For the anti-skid braking system hydraulic unit ABS-HU, and the traction control system hydraulic unit TCS-HU a control command is output to solenoid valves 9, 10 for the respective rear wheels in order to execute the rear wheel hydraulic control during occurrence of drive wheel slip. Furthermore, during abrupt braking operation, in order to execute the anti-skid brake control, a control command is issued to a solenoid valve 13 for the right and left rear wheels and to solenoid valves for the front wheels.

It is noted that the control unit TCS-ECU outputs a turn on command to the TCS fail lamp 14 if TCS failure occurs. During TCS operation, a turn on command is issued to turn on a TCS operation indicating lamp 15.

The TCM control circuit includes a throttle motor drive circuit, receiving a first throttle signal TV01 from the first throttle valve opening angle sensor 16, outputting an actual opening angle DKV of the first throttle valve to the TCS-ESU, inputting the opening angle signal TVG02 of the second throttle valve derived from the second throttle sensor 17 as feedback information for the target opening angle DKR of the second throttle valve, and supplying a motor drive current $I_M$ to a throttle motor 18 on the basis of a target opening angle DKR of the second throttle valve from the TCS-ECU.

The first throttle valve 19 installed on the first throttle sensor 16 is valve operated in cooperation with an accelerator pedal 20. The second throttle valve 21 installed on a second throttle sensor 17 is installed in an engine intake passage 22 in series with the first throttle valve 19 and opened and closed by means of the throttle motor 18.

Figure 2:
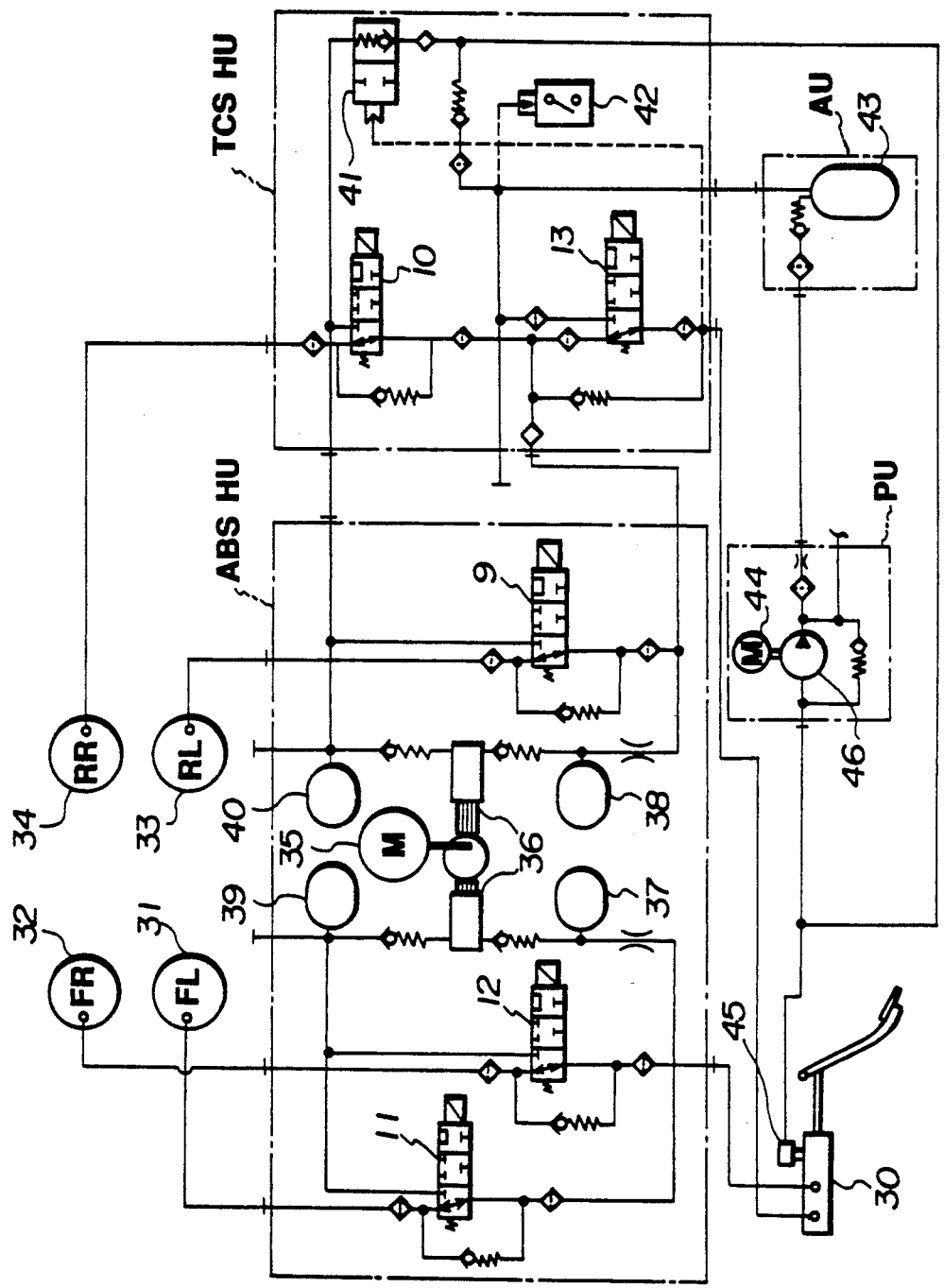
FIG. 2 is a schematic hydraulic circuit block diagram of a brake liquid pressure control system in the preferred embodiment shown in FIG. 1.

FIG. 2 shows a hydraulic circuit diagram of a brake liquid pressure control system functioning as the left-right rear wheel independent brake control system and anti-skid brake control system.

A traction control system hydraulic unit TCS-HU, an accumulator unit AU, and pump unit PU are added to a well-known anti-skid brake system hydraulic unit ABS-HU installed midway along an oil path between a brake master cylinder 30 and each wheel cylinder 31, 32, 33, and 34.

The ABS-HU includes a motor 35, pump 36, accumulators 37, 38, reservoir tanks 39, 40, left front wheel solenoid valve 11, right front wheel solenoid valve 12, and a left rear wheel solenoid valve 9 for the left rear wheel TCS.

The TCS-HU includes an ABS-TSC switch valve 41, a solenoid valve 10 for the right rear wheel TCS, a solenoid valve 13 for the left and right rear wheel (ABS), and a hydraulic switch 42.

The accumulator unit AU includes a gas piston accumulator 43 having an inner wall being doubly and hermetically sealed. The pump unit PU is provided with a pump 46 supplying operating oil from the reservoir tank 45 which is also attached to a master cylinder 30.

Figure 3:
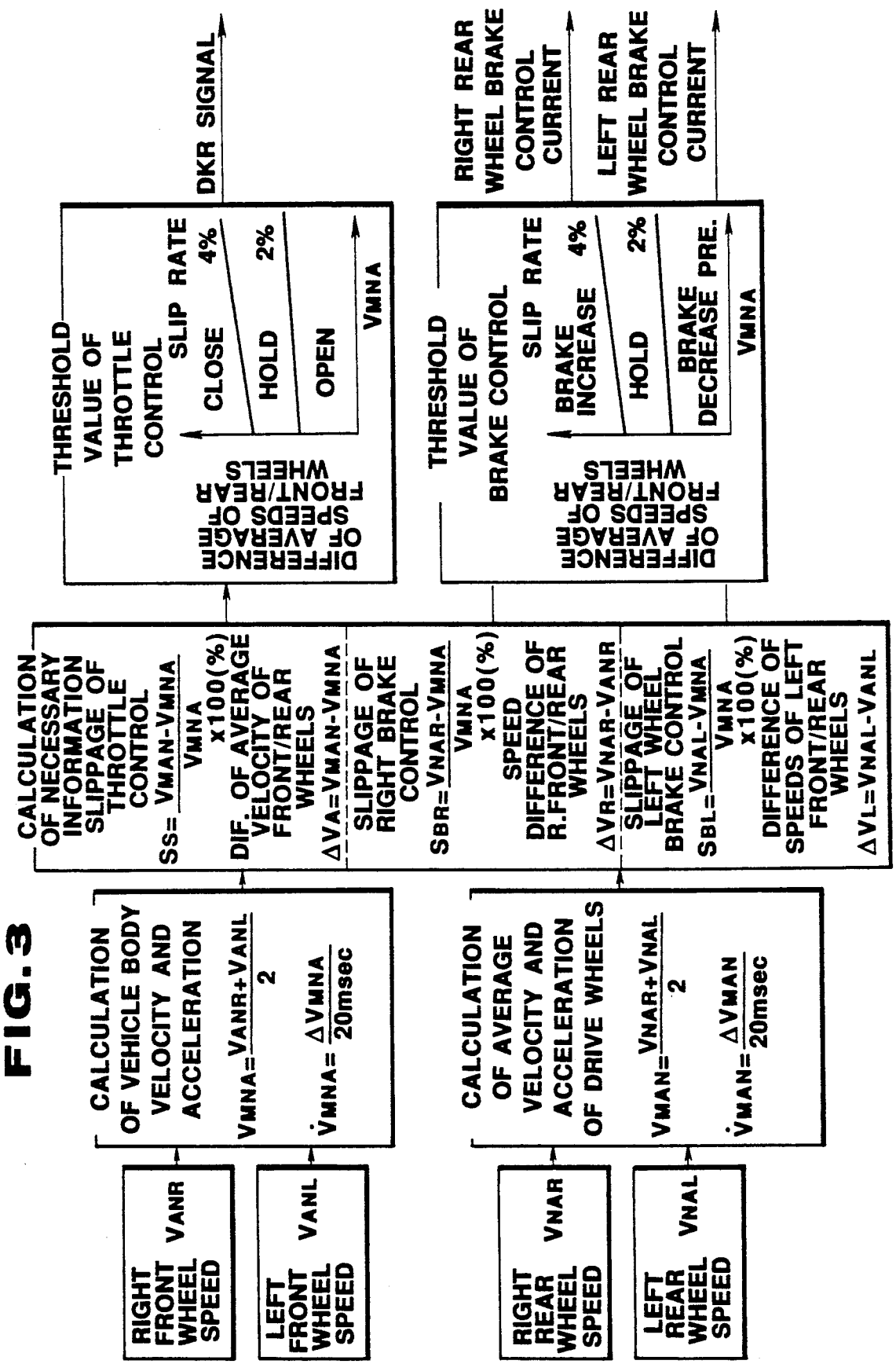
FIG. 3 is an explanatory block diagram indicating a basic traction control operation.

In addition, during anti-skid brake control operation, the ABS-TCS switch valve 41 operating the brake liquid pressure for the rear wheels from the master cylinder 30 as a signal pressure is closed. In addition, the solenoid valves 9 and 10 for the right and left rear wheels TCS are fixed at a pressure increased position, as shown in FIG. 3.

In this state, an operation control for the left front wheel solenoid valve 11, right front wheel solenoid valve 12, and right-and-left rear wheel ABS is carried out in response to an external command.

In addition, during right and left rear wheel independent brake control operations, the motor is driven and controlled in accordance with a motor relay 47 which turns ON and OFF in cooperation with a pressure switch. Operating oil under a predetermined pressure is maintained in a gas piston accumulator 43. Each of the solenoid valves 9 and 10 for the right and left rear wheels TCS is controlled in response to an external command.

Next, operation of the traction concentrated control will be described below.

(1) Basic Traction Control

FIG. 3 shows a block diagram indicating a basic traction control operation from a point of time at which a control start condition is satisfied in the TCS-ESU to a point of time at which a control end condition is satisfied.

Required control information is derived by calculation on the basis of the signals from the respective wheel speed sensors 1, 2, 3, and 4.

By comparison of a throttle control threshold value map previously set, a brake control threshold map, and the control information, a DKR signal is output which controls the second throttle valve 21 in either of three modes, open, closed, and hold. A brake control current is output, for the respective left and right rear wheels, which is used to control the brake liquid pressure in any one of, pressure increase, hold, or pressure decrease conditions.

Figure 4:
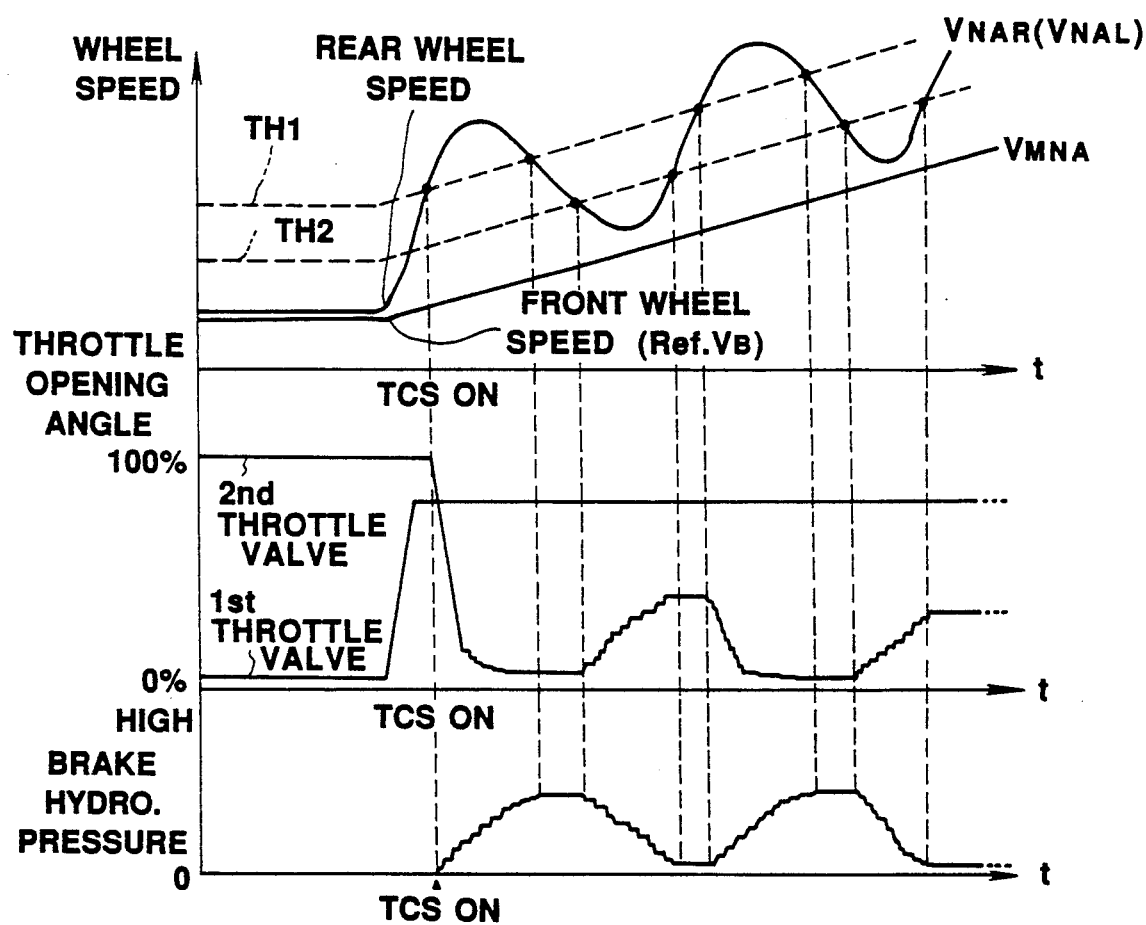
FIG. 4 is a signal timing chart of the basic traction control operation shown in FIG. 3.

FIG. 4 is a timing chart of an intermediate acceleration during which the basic traction control generates a rear wheel slip due to an abrupt depression of the accelerator.

(2) Throttle control

Figure 5:
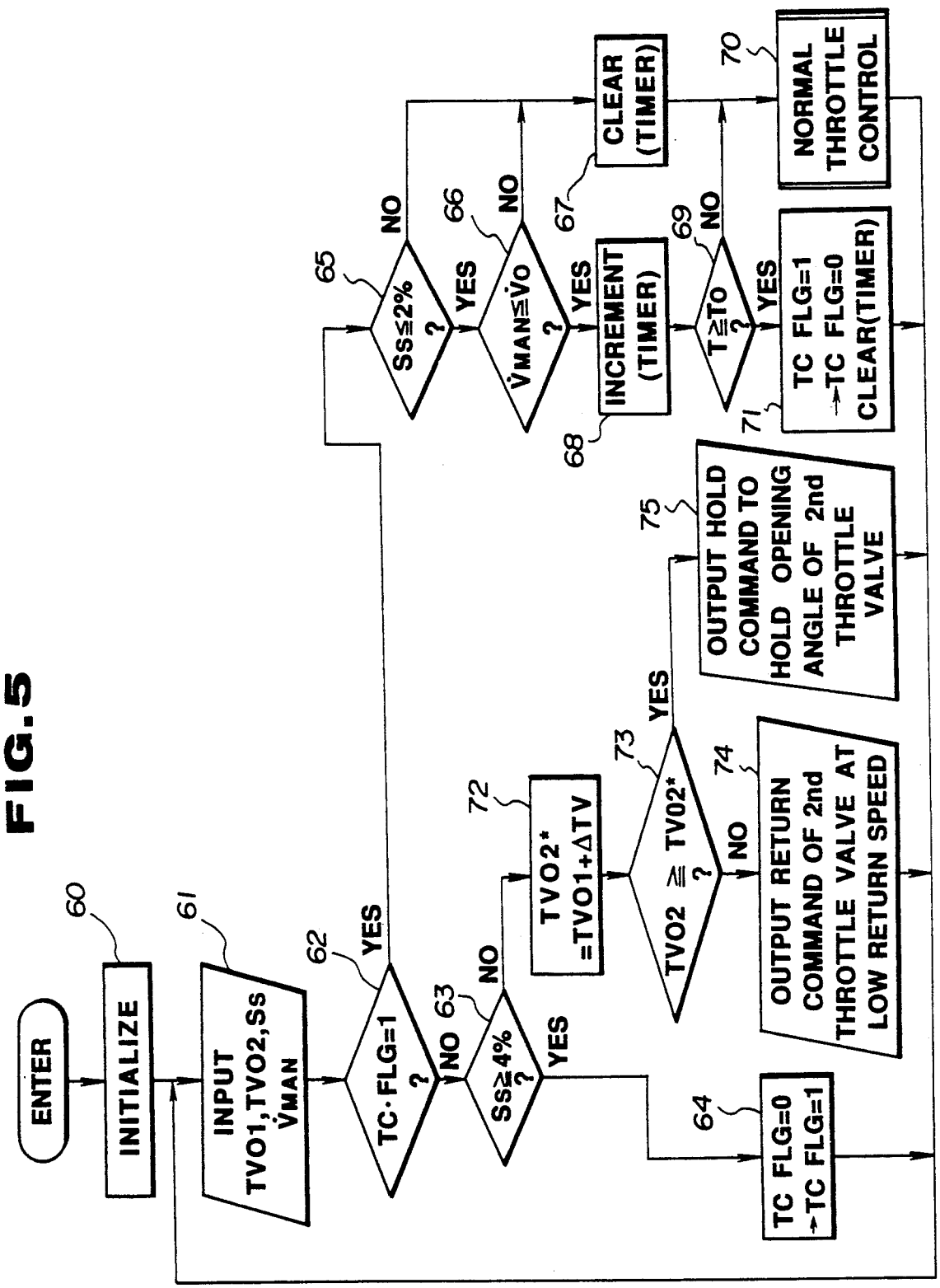
FIG. 5 is an operational flowchart of output signals at respective portions of the system shown in FIG. 1 during a second throttle control operation.
Figure 6:
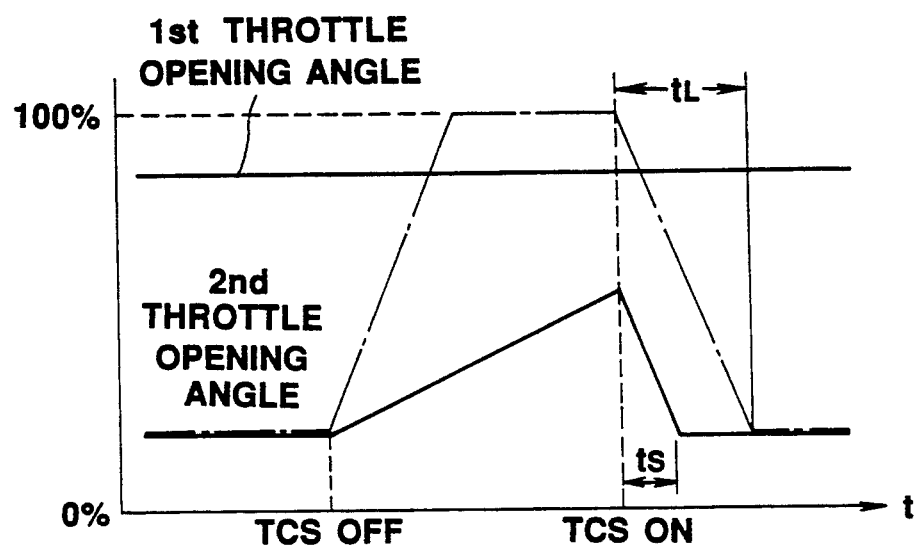
FIG. 6 is a timing chart of a second throttle opening angle characteristic in a case where another throttle control is resumed immediately after a previous throttle control is ended.

FIG. 5 is an operational flowchart indicating a throttle control operation carried out in the TCS-ECU and TCM.

In a step 60, initialization processing (for example, TC·FLG=0, a timer value T is cleared) is carried out.

Required control information, such as a first throttle signal TV01 and a second throttle signal TV02, the first throttle signal TV01 and second throttle signal TV02 indicating actual opening angles of the first and second throttle valves 19 and 21, is input.

In a step 62, a control unit of the TCS-ECU and TCM (hereinafter referred to only as control unit) determines whether the second throttle valve is controlled (TC·FLG=1) or uncontrolled (TC·FLG=0) from a flag of TC·FLG.

In a step 63, the control unit determines whether a slip rate $S_S$ for the throttle control is above 4%. That is to say, a start condition for throttle control is that a slip rate of a throttle control $S_S$ is $S_S \geq 4\%$. When both conditions are satisfied, the routine goes to a step 64 in which TC·FLG is set to 1.

If TC·FLG=1 in the step 62, the routine goes to a step 65 in which it is determined if a slip rate $S_s$ of the second throttle control is $S_s \leq 2\%$. In the next step 66, the control unit determines whether the rear wheel acceleration $\dot{V}_{MAN}$ is below the set acceleration $\dot{V}_o$.

When both of the steps 65 and 66 are satisfied, the routine goes to a step 68 where the timer value T is incremented and the routine goes to a step 69. Then, the control unit determines whether a timer value T exceeds a set timer value $T_o$ in a steel 69.

That is to say, if the slip rate $S_s$ for the throttle control is $S_s \leq 2\%$ and a condition under a state in which the rear wheel acceleration $\dot{V}_{MAN}$ is $\dot{V}_{MAN} \leq \dot{V}_c$ is continued only for a set duration of a timer value To an end condition for the throttle control is satisfied. When the end condition is satisfied, the routine goes to a step 71 in which TC·FLG is set from 1 to 0 and a timer value T is cleared.

In addition, when the end condition is satisfied from the start of second throttle valve control, the routine goes to a step 70 in which normal control of the second throttle valve is carried out in the way described according to the basic traction control operation.

On the other hand, if the slip rate $S_s$ of the second throttle control in a step 63 is determined to indicate $S_s < 4\%$, no control operation is initiated for the second throttle valve 21 (TC·FLG 0) and the routine goes to a return control processing step after a step 72.

In the step 72, a target opening angle TV02* of the second throttle valve 21 is calculated in the following formula: TV02*=TV01+ΔTV.

In the above formula, ΔTV denotes an offset quantity of a valve opening angle previously set.

In a step 73, a second throttle signal TV02 is received and the control unit determines whether TV02≧TV02*.

In a case where TV02<TV02* (NO in the step 73), the routine goes to a step 74 in which a command to return the second throttle valve 21 in an open direction at a return speed lower than that carried out during the normal throttle control operation.

In addition, if TV02≧TV02*, the routine goes to a step 75 in which the opening angle of the second throttle valve 21 is held constant.

Hence, in the second throttle valve return control to return the second throttle valve 21 to its fully open position, the following feature is provided as described below.

(1) Since during the resumption of a new control immediately after the second throttle control ends, a return speed of the second throttle valve 21 toward its open position is set so as to be slower than that carried out during the normal throttle control which suppresses drive wheel slip, the second throttle valve 21 can be set to a lower opening angle of the second throttle valve 21 for a short period of time $t_s$ during a resumption of control and then responsive characteristics can be improved.

It is noted that even when control is resumed soon after a lapse of the throttle control end, the second throttle valve 21 is not fully returned to the full opening angle and the offset quantity ΔTV is added to the valve opening angle of the first throttle valve 19, therefore the responsive characteristic of suppressing slip can be improved.

Figure 7:
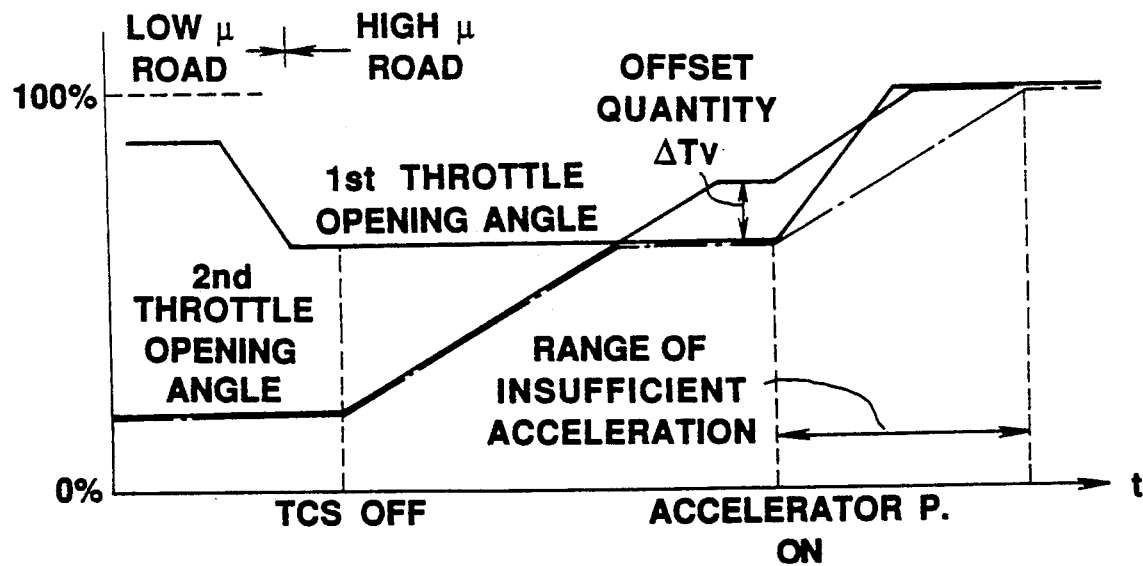
FIG. 7 is a timing chart of a throttle opening angle characteristic in a case where abrupt operation of an accelerator pedal is carried out after the end of the throttle control carried out by the system shown in FIG. 1.

(2) In a case where abrupt acceleration carried out after the end of the throttle control, the opening angle of the second throttle valve 21 is held at the opening angle to which the offset quantity ΔTV is added. Therefore, the engine output which corresponds to the opening angle of the first throttle valve 19 is derived until the opening angle of at least offset quantity TV indicates zero, as denoted by a solid-line characteristic curve of FIG. 7. Acceleration characteristics are much improved thereby.

It is noted that the offset quantity of the valve opening angle described above may be varied according to the opening angle of the first throttle valve 19.

Since, as described hereinabove, in the engine output control system having tandem throttles including first and second throttle valves applicable to automotive vehicles according to the present invention, the return speed of the second throttle valve is made slower than that carried out during the slip suppression control through the second throttle valve after the end of the engine output control and the target valve opening angle of the second throttle valve is the valve opening angle to which the predetermined offset quantity is added, both of improvement in slip response characteristics in situations in which drive wheel slippage is repeatedly generated and improvement in acceleration after the end of drive wheel slippage control can be achieved.

It will fully be appreciated by those skilled in the art that the foregoing description has been made in terms of the preferred embodiment and various changes and modifications may be made without departing from the scope of the present invention which is to be defined by the appended claims.

What is claimed is:

1. A system for controlling an engine output to suppress drive wheel slippage in an automotive vehicle, comprising:
   a) a first engine driving force adjusting mechanism installed within an engine intake passage and interlocked with an accelerator of said vehicle;

b) a second engine driving force adjusting mechanism installed in series with said first engine driving force adjusting mechanism;

c) an actuator for actuating said second engine driving force adjusting mechanism;

d) first means for detecting slip conditions of wheels to which an engine output driving force is transmitted;

e) second means for determining whether a predetermined control start condition including wheel slip information is satisfied;

f) third means for determining whether a predetermined control end condition including wheel slip information is satisfied;

g) fourth means for outputting an actuator control command to said actuator, said actuator control command being output to said actuator after said predetermined control start condition is satisfied and until said predetermined control end condition is satisfied so that the actuation of said second engine driving force adjusting mechanism causes said engine output to be reduced for a duration of time in which said predetermined control start condition is satisfied and thereafter until said predetermined control end condition is satisfied;

h) fifth means for setting an offset quantity on an operating variable of said second engine driving force adjusting mechanism with respect to an operating variable of said first engine driving force adjusting mechanism;

i) sixth means for outputting another actuator control command to said actuator after said predetermined end condition is satisfied so that a return speed of said second engine driving force adjusting mechanism toward its zero operating variable position is slower than the speed of said second engine driving force adjusting mechanism toward its maximum operating variable position carried out during a slip suppression control through said second engine driving force adjusting mechanism in response to said actuator control command and so that a target operating variable of said second engine driving force adjusting mechanism, which second mechanism is actuated to move toward its target operating vehicle position in response to said another actuator control command to return toward its original zero operating variable position at said return speed, is set to a present operating variable of the first engine driving force adjusting mechanism to which the offset quantity is added to thereby enable said second mechanism to move to said target operating variable position.

2. A system as set forth in claim 1, wherein the automotive vehicle has four wheels, the rear wheels thereof being driven from the engine output, and wherein the first means includes seventh means for detecting a right front wheel (right non-driven wheel) speed $V_{ANR}$; eighth means for detecting a left front wheel (left non-driven wheel) speed $V_{ANL}$; ninth means for detecting a right rear wheel (right driven wheel) speed $V_{NAR}$; tenth means for detecting a left rear wheel (left driven wheel) speed $V_{NAL}$; eleventh means for calculating an average speed of the driven wheels and an acceleration thereof as follows: $V_{MAN}=(V_{NAR}+V_{NAL})/2$, and $\dot{V}_{MAN}=\Delta V_{MAN}/20$ msec.; twelfth means for calculating a vehicle body speed as follows: $V_{MAN}=(V_{ANR}+V_{ANL})/2$; and thirteenth means for calculating a slip rate of the driven wheels used to control the second engine driving force adjusting mechanism as follows: $S_s=(V_{MAN}-V_{MNA})/V_{MNA} \times 100$ (%).

3. A system as set forth in claim 2, wherein the predetermined control start condition is such that the slip rate ($S_s$) of the driven wheels is equal to or above 4%.

4. A system as set forth in claim 3, which further comprises a timer which counts a time T when the slip rate of the driven wheels is equal to or below 2% ($S_s \leq 2\%$) and acceleration of the driven wheels is equal to or below a predetermined acceleration $\dot{V}_{MAN} \leq V_o$) and wherein the predetermined control end condition is such that the timed value T of the timer exceeds a predetermined time $T_o$.

5. A system as set forth in claim 4, wherein the sixth means outputs said another actuator control command to the valve actuator when no control of said second engine driving force adjusting mechanism is carried out and the slip rate of the driven wheels has a value $S_s < 4\%$.

6. A system as set forth in claim 5, wherein the sixth means includes: fourteenth means for detecting an actual opening angle of said second engine driving force adjusting mechanism; and fifteenth means for determining whether the actual opening angle of said second engine driving force adjusting mechanism is equal to or greater than a target opening angle which is the same target operating variable of said second engine driving force adjusting mechanism when said sixth means outputs said another actuator control command to said actuator, and wherein said sixth means outputs said another actuator control command to said actuator so that the return speed of the second engine driving force adjusting mechanism is slower than that during the slip suppression control when the actual opening angle of said second engine driving force adjusting mechanism is below a target opening angle of said first engine driving force adjusting mechanism and so that the opening angle of said second engine driving force adjusting mechanism remains unchanged when the actual opening angle of said second engine driving force adjusting mechanism is equal to or above the target opening angle of said second driving force adjusting mechanism.

7. A system as set forth in claim 6, wherein the slip suppression control is such that the opening angle of said second engine driving force adjusting mechanism is adjusted in three modes, open, closed and hold, according to the average speed difference of the front and driven wheels ($V_A = V_{MAN} - V_{MNA}$), vehicle body speed ($V_{MNA}$) and slip rate of the driven wheels ($S_s$).

8. An engine control system for an automotive vehicle, comprising:

a) a first throttle valve installed within an engine intake passage and interlocked with an accelerator of said vehicle;

b) a second throttle valve installed in series with said first throttle valve, said second throttle valve being normally open and controlled independently of said first throttle valve when a slip suppression control is carried out;

c) an actuator for actuating the second throttle valve;

d) first means for detecting slip conditions of a wheel to which an engine output is transmitted;

e) second means for establishing a predetermined control start condition of said slip suppression control according to wheel slip conditions and determining whether said predetermined control start condition is satisfied;

f) third means for establishing a predetermined control end condition of said slip suppression control according to said slip conditions and determining whether said predetermined control end condition is satisfied;

g) fourth means for outputting an actuator control command to said actuator to actuate said second throttle valve to suppress wheel slippage, said actuator control command being output to said actuator after said predetermined control start condition is satisfied and until said predetermined control end condition is satisfied so that the actuation of said second throttle valve causes said engine output to be reduced for a duration of time in which said predetermined control start condition is satisfied and thereafter until said predetermined control end condition is satisfied;

h) fifth means for setting an offset quantity of an operating variable of said second throttle valve with respect to an operating variable of said first throttle valve; and i) sixth means for outputting another actuator control command to said actuator after said predetermined control end condition is satisfied so that a return speed of said second throttle valve to said normally open position is slower than the speed of said second throttle valve toward its maximum operating variable position carried out during slip suppression control, in response to said actuator control command and so that a target operating variable of said second throttle valve, which second valve is actuated to move toward its target operating variable position in response to said another actuator control command to return to its normally open position, is set to a present operating variable of said first throttle valve to which said offset quantity is added to thereby enable said second throttle valve to move to said target operating variable position.

9. A system as set forth in claim 8, which further comprises seventh means for detecting an actual opening angle of said first throttle valve and wherein said offset quantity is varied according to the actual opening angle of said first throttle valve.

10. A method for controlling an engine output in an automotive vehicle including a first throttle valve installed within an engine intake passage and interlocked with an accelerator of the vehicle; a second throttle valve installed in series with said first throttle valve, said second throttle valve being normally open and controlled independently of said first throttle valve when a slip suppression control is carried out; an actuator for actuating said second throttle valve; comprising the steps of:

a) detecting slip conditions of drive wheels to which said engine output is transmitted;

b) establishing a predetermined control start condition of a slip suppression control according to said slip conditions and determining whether said predetermined control start condition is satisfied;

c) establishing a predetermined control end condition of slip suppression control according to said slip conditions and determining whether said predetermined control end condition is satisfied;

d) outputting an actuator control command to said actuator to actuate said second throttle valve to suppress slip of said drive wheels, said actuator control command being output to said actuator after said predetermined control start condition is satisfied and until said predetermined control end condition is satisfied so that the actuation of said second throttle valve causes said engine output to be reduced for a duration of time in which said predetermined control start condition is satisfied and thereafter until said predetermined control end condition is satisfied;

e) setting an offset quantity on an operating variable of said second throttle valve with respect to an operating variable of said first throttle valve; and f) outputting another actuator control command to said actuator after said predetermined control end condition is satisfied so that a return speed of said second throttle valve to its normally open position is slower than the speed of said second throttle valve toward its maximum operating variable position carried out during slip suppression control through said second throttle valve in response to said actuator control command and so that a target operating variable of said second throttle valve, which second valve is actuated to move toward its target operating variable position in response to said another actuator control command to return to its normally open position, is set to a present operating variable of said first throttle valve to which said offset quantity is added to thereby enable said second throttle valve to move said target operating variable position.

* * * * *